(12) United States Patent
Grech et al.

(10) Patent No.: US 8,109,088 B2
(45) Date of Patent: Feb. 7, 2012

(54) MASTER CYLINDER WITH U-SHAPED SEAL

(75) Inventors: Daniel Grech, Lamorlaye (FR); Antony Auguste, Villier sur Marne (FR); Lionel Bourgois, Montmagny (FR); Nicolas Quiniou, Villemonble (FR); Marc Noblet, Paris (FR); Stéphane Lacroix, Tournan en Brie (FR); Omar Brahmi, Jiangsu Province (CN)

(73) Assignee: Robert Bosch GmbH, Stuttgart (DE)

( * ) Notice: Subject to any disclaimer, the term of this patent is extended or adjusted under 35 U.S.C. 154(b) by 730 days.

(21) Appl. No.: 12/265,885

(22) Filed: Nov. 6, 2008

(65) Prior Publication Data
US 2009/0113891 A1    May 7, 2009

(30) Foreign Application Priority Data

Nov. 6, 2007   (FR) ...................................... 07 07812

(51) Int. Cl.
*F15B 7/08* (2006.01)
*F16J 9/12* (2006.01)

(52) U.S. Cl. ........................... 60/588; 277/439; 277/465

(58) Field of Classification Search .................... 60/588; 277/439, 465
See application file for complete search history.

(56) References Cited

U.S. PATENT DOCUMENTS

| 7,104,059 B2 | 9/2006 | Tsubouchi et al. |
| 7,181,911 B2 | 2/2007 | Ishikawa et al. |

FOREIGN PATENT DOCUMENTS

WO    2005019007    3/2005

*Primary Examiner* — Daniel Lopez
(74) *Attorney, Agent, or Firm* — Michael Best & Friedrich LLP

(57) ABSTRACT

Our problem relates to a master cylinder with a U-shaped seal. Our goal is to avoid defective bleeding of hydraulic braking systems. The defects arise out of the fact that the vacuum causes the lips of the seal (21) to stick together and to stick against the wall (41). To achieve this, reliefs (42) will be created on one wall (44) of one lip (28) facing the other lip (27) and on the edge face (50) of this same lip. These reliefs will prevent the lips from sticking tightly to one another and to the wall facing the edge face of the lips. This lack of sticking will prevent a vacuum from being created between the two lips and between the edge face of the lips and the wall (41). As a result, the seal will be able to return to a position in which bleeding can be performed effectively.

6 Claims, 2 Drawing Sheets

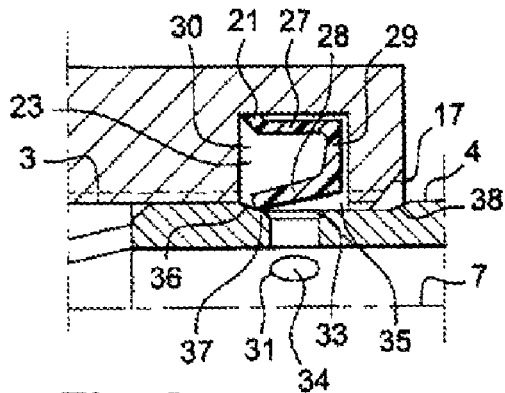
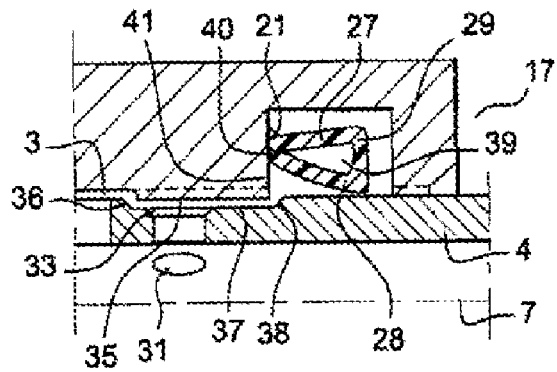
Fig. 2
Fig. 3
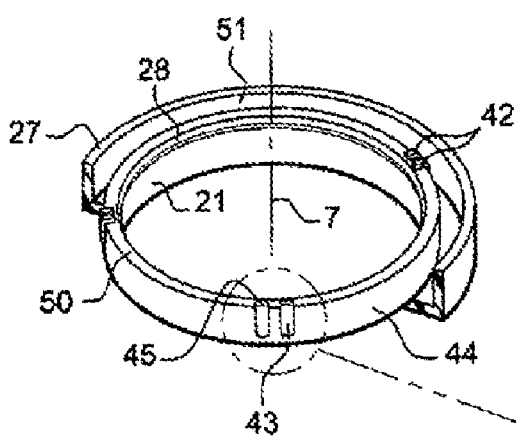
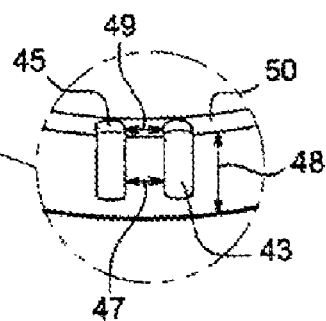
Fig. 4
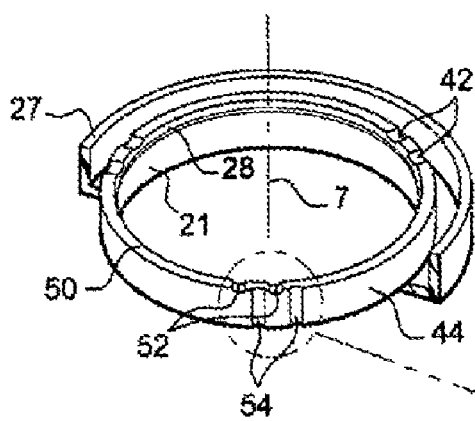
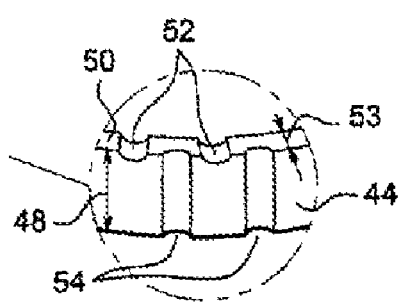
Fig. 5

MASTER CYLINDER WITH U-SHAPED SEAL

BACKGROUND AND SUMMARY OF THE INVENTION

The invention relates to a master cylinder with a U-shaped seal. It is an object of the invention to improve the efficiency with which hydraulic braking systems fitted with such a master cylinder can be bled. The invention is more specifically intended for the field of motor vehicles but could be applied to other fields.

Master cylinders comprising a master cylinder body, a piston, a reservoir for brake liquid, or more generally for hydraulic fluid, and a pressure chamber, are known. The piston slides in a bore formed in the body of the master cylinder. The pressure chamber is connected to the hydraulic fluid reservoir via a hydraulic fluid pipe.

The master cylinder has a seal that allows the pressure in the pressure chamber to be increased. This seal is situated between a wall delimited by the bore of the body of the master cylinder and the piston. This seal prevents hydraulic fluid from passing from the pressure chamber to the hydraulic fluid reservoir. The passage of hydraulic fluid is prevented according to the position of the piston in the bore of the master cylinder. This seal is housed in a peripheral groove.

The peripheral groove is hollowed into the wall of the body of the master cylinder. This groove is circular cylindrical and faces the piston.

The seal is made of rubber and has a U-shaped profile. The profile comprises a base, the bottom of the U, to which two lips, the limbs of the U are connected. These two lips extend both in the same direction from this base.

A first lip, situated on the inside, is intended to face the piston. This lip extends from the smallest diameter of the base of the seal. This inner lip presses against the piston.

A second lip, situated on the outside, is intended to face the wall of the body of the master cylinder. More specifically, this second lip is intended to face the wall of the peripheral groove on the opposite side of the seal to the piston. This wall is formed by the closed end of the groove. The second lip extends from the largest diameter of the base of the seal. The outer lip rests against the closed end of the groove.

At rest, that is to say when a brake pedal of the vehicle is not being actuated, the pressure chamber is full of hydraulic fluid from the reservoir. The reservoir and the pressure chamber therefore communicate via a hydraulic fluid passageway.

When the piston moves forward in the bore of the body of the master cylinder, that is to say when the brake pedal is actuated, hydraulic fluid is prevented from flowing from the pressure chamber into the reservoir. What happens is that as it advances along the wall of the body of the master cylinder, the piston becomes positioned relative to the seal in such a way that the seal prevents hydraulic fluid from passing from the pressure chamber to the reservoir. The hydraulic fluid in the pressure chamber is therefore isolated from the hydraulic fluid contained in the reservoir. The forward movement of the piston then causes the pressure in the pressure chamber to rise. It then follows that the hydraulic fluid is injected from the pressure chamber into the vehicle braking system.

When the hydraulic braking system is being bled, the braking circuit, the outlet from the master cylinder is open. The expelled hydraulic fluid is collected in an open container positioned at a suitable location. To make this bleeding operation easier, the brake pedal is pumped hard. This pumping of the pedal forces the piston to move back and forth from its rest position to its forward position. This pumping of the pedal has the effect of discharging the liquid that is to be bled, together with any air bubbles that might be present in the hydraulic braking system.

As the piston moves along the wall of the master cylinder, during brake bleedings, a depression is created in the peripheral groove in which the seal is positioned. This depression is created as a result of the sharp forward movements of the piston in the bore. This depression will cause the lips of the seal to detach from the walls against which they respectively rest. This detachment may, in some cases, cause the lips to move closer to one another and cause the lips to move closer toward the wall facing an edge face of these lips. The inner lip and the outer lip will stick together. The two limbs of the U come into contact with one another at their ends. A vacuum will then be created between the lips of the seal in the thus-closed U. This vacuum forces the lips to remain stuck together as the piston returns to the rest position. This vacuum, is irreversible because, when the depression in the groove disappears, at best, the returning hydraulic fluid forces the two lips to remain stuck together. Once deformed in this way, the seal no longer seals.

Furthermore, a vacuum may also be created between the lips and the wall against which the edge face of the lips is stuck. This vacuum also forces the lips to remain stuck to the wall of the groove facing the edge face of the lips as the piston returns to the rest position, and once again the seal fails to perform its sealing function. The hydraulic fluid contained in the pressure chamber can then seep between the wall of the master cylinder body and the piston, as far as the hydraulic fluid reservoir.

The only way to avoid this lack of sealing is to bleed the brakes at a limited throughput and with a limited rate of pedal travel, otherwise the seal will no longer prevent hydraulic fluid from passing from the pressure chamber to the hydraulic fluid reservoir. It will be appreciated that bleeding in this way becomes a far more tricky operation. The operator has to have appropriate training and this training is an irksome constraint.

In an attempt to prevent these lips from sticking together it might be possible to increase the rigidity of the lips. To do that, an internal skeleton could be incorporated into the lips. Seals such as this with an internal skeleton could be produced using a dual molding technique. However, that would lead to complicated manufacture and a not-insignificant increase in cost.

Another solution might be to create passageways that cause the outside of the lips to communicate with the inside of the lips. These passageways would make it possible to prevent a vacuum from forming between the lips and between the lips and the wall when the pedal is being pumped. However, this solution would reduce the sealing of the lips and the seal would therefore no longer seal satisfactorily. In addition, producing such passageways in a seal of this size would have a tendency to weaken the structure of the seal. These solutions are therefore not acceptable for solving the problem such as it stands.

In order to solve this problem, in the invention, reliefs are made to prevent a vacuum from being created between the two lips. Thus, as the lips move closer together, the lips cannot stick tightly together because the reliefs prevent the lips from making a perfect seal with one another or with the wall facing the edge face of the lips. The fact that a perfect seal is not made between these lips and/or wall prevents the vacuum from being created. The vacuum that could create a depression between the two lips is removed via a communicating space allowing the outside and the inside of the lips to communicate with one another, this space being formed by virtue of the reliefs.

The invention of course can apply to a master cylinder that has several incorporated seals of this type. In addition, the invention can be applied to all kinds of master cylinder, including tandem master cylinders.

One subject of the invention is therefore a brake master cylinder comprising a piston sliding in a chamber of a master cylinder body, the body comprising an inlet allowing hydraulic fluid to enter the chamber, and a smooth seal of circular shape with a U-shaped profile, the U-shaped profile being formed by an inner lip and an outer lip of the seal, the seal being in contact via the inner lip with the periphery of the piston, and via the outer lip with the body, characterized in that it comprises localized reliefs produced on one lip.

BRIEF DESCRIPTION OF THE DRAWINGS

The invention will be better understood from reading the following description and from examining the accompanying figures. These are given merely by way of nonlimiting indication of the invention. The figures show:

FIG. 2: a longitudinal section through part of a master cylinder, in this instance a tandem master cylinder, fitted with a known seal, at rest;

FIG. 3: a longitudinal section through part of a master cylinder, in this instance a tandem master cylinder, fitted with a known seal during brake bleeding;

FIG. 4: a schematic perspective view of a seal according to the invention;

FIG. 5: a schematic perspective view of an alternative form of the seal according to the invention.

DETAILED DESCRIPTION

Figure 1:
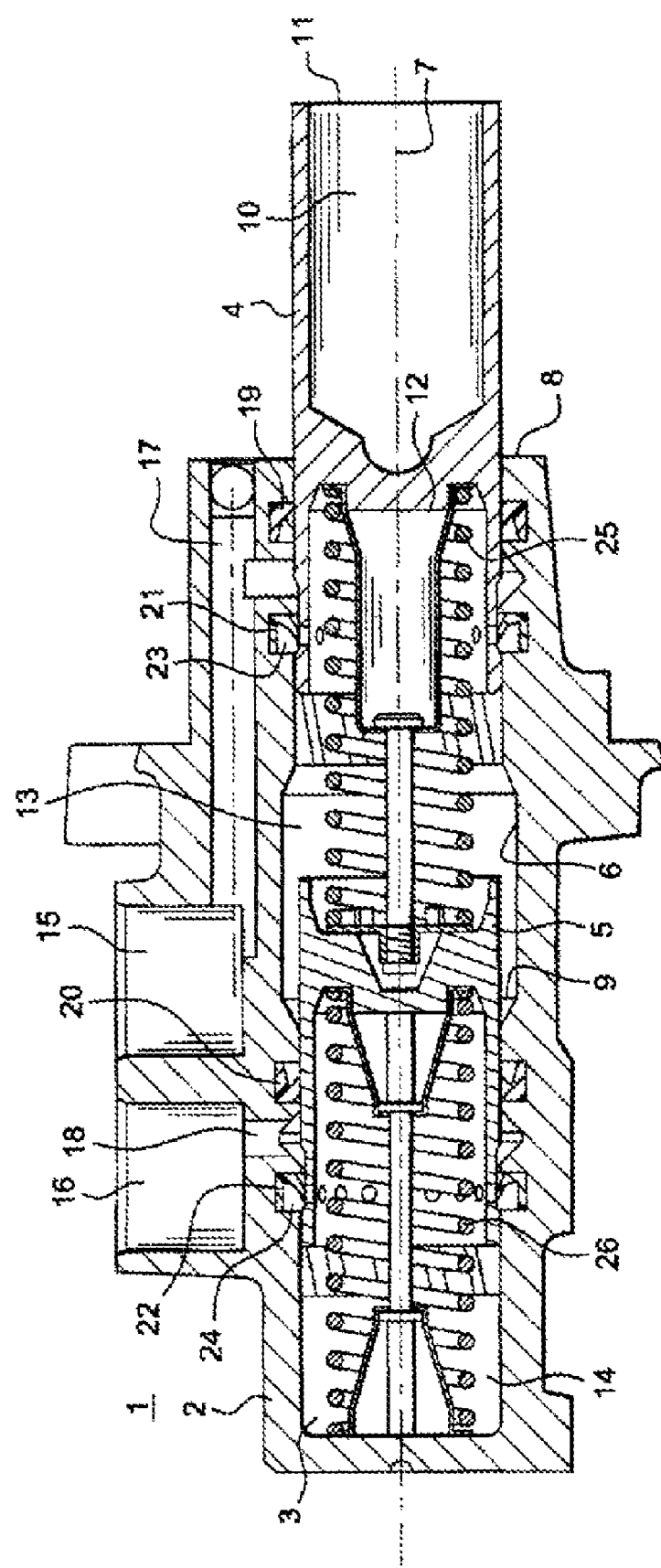
FIG. 1: a longitudinal section through a master cylinder, in this instance a tandem master cylinder, fitted with seals according to the invention.

FIG. 1 depicts a longitudinal section of a master cylinder 1, in this instance a tandem master cylinder, fitted with seals according to the invention. The master cylinder 1 here is a tandem master cylinder but the invention does of course apply to cases in which the master cylinder is a single master cylinder. A tandem master cylinder 1 such as this comprises a body 2 in which there is a bore 3. This tandem master cylinder also comprises a primary hydraulic circuit fitted with a primary piston 4 and a secondary hydraulic circuit is fitted with a secondary piston 5. The primary piston 4 and the secondary piston 5 slide along a wall 6 delimited by the bore 3 of the body 2. The primary piston 4 and the secondary piston 5 slide longitudinally along an axis of insertion 7 of a push rod (not depicted here) inserted into the master cylinder 1. The tandem master cylinder 1 is actuated by the push rod which is itself actuated when a brake pedal (not depicted here, is depressed. A receptacle 10 accommodates this push rod. This receptacle 10 is formed at a rear end 11 of the primary piston 4. A front end 12 of the primary piston is intended to be positioned facing the secondary piston 5. Normally, the axis 7 is an axis that coincides with an axis of movement of the primary piston 4 and with an axis of movement of the secondary piston 5.

The primary piston 4, the secondary piston 5 and the wall 6 of the master cylinder together delimit a primary pressure chamber 13. The secondary piston 5 and the wall 6 of the master cylinder 1 together delimit a secondary pressure chamber 14. The primary piston 4 is intended to compress a hydraulic fluid contained in the primary pressure chamber 13. The secondary piston 5 is intended to compress a hydraulic fluid contained in the secondary pressure chamber 14.

The hydraulic fluid contained in the primary pressure chamber 13 comes from a primary hydraulic fluid reservoir 15. The hydraulic fluid contained in the secondary pressure chamber 14 comes from a secondary hydraulic fluid reservoir 16. The primary reservoir 15 supplies hydraulic fluid to the primary pressure chamber 13 via a primary pipe 17. The secondary reservoir 16 supplies hydraulic fluid to the secondary pressure chamber 14 from a secondary pipe 18. The primary pipe 17 and the secondary pipe 18 are hollowed into the body 2 of the master cylinder and open respectively into the primary pressure chamber 13 and into the secondary pressure chamber 14. The body of the master cylinder 1 therefore has inlets via which hydraulic fluid is supplied to the pressure chambers 13 and 14.

The master cylinder 1 also comprises at least one seal. As a preference, each chamber may comprise two seals. These seals are made of rubber. Each of the seals has a U-shaped profile. Each of these seals forms a cylindrical annulus. Each annulus is developed in a plane perpendicular to the axis 7 of movement of the piston.

In this instance, the primary chamber 13 comprises a first seal 19 and a second seal 21. The secondary chamber 14 comprises a third seal 20 and a fourth seal 22. The invention is aimed at any one of these seals, or several or all of them.

The seal 19 and the seal 20 are positioned respectively at an inlet 8 of the primary chamber 13 and at an inlet 9 of the secondary chamber 14. The seal 19 seals the primary chamber 13 against the outside of the master cylinder. The seal 20 seals the secondary chamber 14 against the primary chamber 13.

The seal 21 is positioned between the wall 6 of the bore 3 of the body 2 and the primary piston 4. The seal 22 is positioned between the wall 6 of the bore 3 of the body 2 and the secondary piston 5. The seal 21 and the seal 22 are situated respectively in a primary peripheral groove 23 and in a secondary peripheral groove 24. The seal 21 and the seal 22 are positioned respectively facing the primary piston 4 and the secondary piston 5. The primary groove 23 and the secondary groove 24 are hollowed into the wall 6 of the body 2. These grooves 23 and 24 are cylindrical and face the piston. The grooves 23 and 24 are hollowed out facing the piston. A generatrix of the grooves 23 and 24 lies in a plane perpendicular to the axis of movement of the primary piston 4.

The primary seal 21 is able to prevent hydraulic fluid from passing from the primary pressure chamber 13 as far as the primary reservoir 15. The secondary seal 22 is for controlling the passage of hydraulic fluid from the primary pressure chamber 14 to the secondary reservoir 16.

The primary piston 4 and the secondary piston 5 are returned to their position of rest by a primary return spring 25 and by a secondary return spring 26, respectively.

FIG. 2 is a longitudinal section through part of a master cylinder, in this instance a tandem master cylinder, 1 fitted with a known seal 21, at rest.

The primary seal 21 in this instance is made of rubber and has a U-shaped profile. The primary seal 21 is positioned about the axis of movement of the primary piston 4. The profile has a base 29, the bottom of the U, to which two lips 27 and 28, the limbs of the U, are connected. These two lips 27 and 28 extend from this base 29 in one and the same direction. The external lip 27 and the internal lip 28 between them at rest delimit an opening 30. This opening 30 in this instance faces towards the secondary chamber 14.

A first lip 27, situated on the outside, is intended to face the wall 6 of the body 2 of the master cylinder 1. More specifically, this second lip 27 is intended to face the wall of the primary groove 23 on the opposite side of the seal 21 to the piston 4. This wall is formed by the closed end of the groove 23. The outer lip 27 extends from the largest diameter of the base 29 of the seal. The outer lip 27 presses against the closed end of the groove 23.

A second lip 28, situated on the inside, is intended to face the piston 4. This lip extends from the smallest diameter of the base 29 of the primary seal 21. This inner lip 28 rests against the piston 4. More specifically, at rest, the internal lip 28 may be positioned so that it rests against a point on the primary piston 4 such that the hydraulic fluid seeps from the primary pressure chamber 13 as far as the primary reservoir 15 through a primary port 31. The primary piston 4 and the secondary piston 5 are equipped with a primary port 31 and with a secondary port 32, respectively. Each of these ports opens at a first end 33 facing the wall 6 of the master cylinder and at a second end 34 facing the corresponding chamber.

The primary seal 21 may be stuck to the primary piston 4 inside a groove 35. This groove in this instance is hollowed into a surface of the primary piston 4 facing the seal 21. The same may be apply to the secondary piston 5. Only the primary groove 35 is described.

The primary piston 4 is positioned in the bore with the end of the internal lip 28 of the primary seal 21 opposite the base 29 of the primary seal 21 positioned against a groove 35. The inner lip 28 may press against the groove 35 in the closed end of the groove 35. Another primary groove (not depicted) could be created at a position close to the seal 19 in addition to or in place of the aforementioned primary groove 35.

The primary groove 35 forms a first surface 36, a second surface 37 and a third surface 38 which are joined together as a continuum. The first surface 36 is made continuous and flat at an angle to the axis 7. This angle of inclination is such that the junction between the surface 36 and the remainder of the surface formed by the primary piston 4 is closer to the secondary piston 5 than is the junction between the surface 36 and the surface 37. This surface is close to the secondary piston 5 by comparison with the surfaces 37 and 38. The second surface 37 is flat and relatively parallel to the axis 7. The surface 37 is located between the surface 36 and the surface 38. The third surface 38 is made continuous and flat and at an angle to the axis 7. This surface 38 connects the second surface 37 to a remainder of the surface formed by the primary piston 4. The angle of inclination of the surface 38 is such that the junction between the surfaces 37 and 38 is closer to the secondary piston 5 than is the junction between the surface 38 and the remainder of the surface formed by the primary piston 4. The angle of inclination of the surfaces 36 and 38 is created in such a way that the primary seal 21 resting against the surfaces 36 and 38 does not impede the movement of the primary piston 4.

At rest, that is to say when the brake pedal is not being actuated, the primary seal 21 is positioned resting against the groove 35 downstream of the primary port 31. The primary port 31 may be hollowed from the second surface 37 of the groove. The primary seal 21 may be positioned resting against the first surface 36 and against the second surface 37 simultaneously. Alternatively, the primary seal 21 may be positioned resting against the first surface 36 only or against the second surface 37 only. The primary piston 4 is positioned with respect to the primary seal 21 and with respect to the primary pipe 17 in such a way that the hydraulic fluid flows from the primary pressure chamber 13 toward the primary reservoir 15 via the primary port 31 and via the primary pipe 17.

During brake bleeding, the primary piston 4 is thrust suddenly into the bore 3 of the master cylinder towards the secondary piston 5 and longitudinally with respect to the axis of the primary piston 4. The primary piston 4 slides along the wall 6 of the bore 3 of the master cylinder and therefore along the primary seal 21. The primary seal 21 is therefore positioned resting against the primary piston between the primary port 31 and the primary pipe 17. The primary seal 21 is positioned upstream of the primary port 31, longitudinally with respect to an axis passing through the primary port and relatively parallel to the axis of the piston, in the direction of forward travel of the primary piston. The hydraulic fluid can no longer pass through the primary port 31 because the primary seal 21 is positioned resting against the primary piston and therefore blocks access of the liquid through the primary port 31. The pressure in the primary chamber 13 therefore rises. The primary seal 21 is positioned resting against the rest of the surface of the primary piston 4. However, the primary seal 21 could be positioned resting against the second or third surface of the primary groove 35, always in such a way as to prevent hydraulic fluid from passing from the primary pressure chamber 13 to the primary reservoir 15.

FIG. 3 is a partial longitudinal section through a master cylinder, in this instance a tandem master cylinder, fitted with a known seal during brake bleeding. When the hydraulic system is being bled, pumping of the pedals causes sharp movements of the primary piston 4 towards the primary chamber 13. These sharp forward movements of the primary piston 4 create a depression in the groove 23. This depression sucks out the hydraulic fluid contained between the lips 27 and 28, leading to a depression between the lips 27 and 28. The depression between the lips 27 and 28 causes the lips 27 and 28 to detach from the walls against which they are resting. The lips 27 and 28 stick together. A vacuum 39 is created between the wall of the lips facing one another. This vacuum keeps the lips 27 and 28 stuck together.

A vacuum 40 may also be created between the edge face of the lips 27 and 28 and the wall 41 facing the edge face of the lips 27 and 28. This vacuum 40 keeps the lips 27 and 28 stuck to the wall 41.

As the primary piston 4 returns to its rest position, the depression that has been created in the groove 23 disappears because the hydraulic fluid contained in the reservoir 15 and in the chamber 13 comes back into contact with one another. However, the vacuums 39 and 40 still keep the lips jammed together and against the wall. In addition, the difference in pressure between the inside of the groove 23, which is returned to a normal pressure because the depression that was therein has disappeared, and the vacuums 39 and 40, keep the lips 27 and 28 stuck even move firmly together and even more firmly against the wall 41. In this situation, the seal 21 no longer provides an effective seal between the primary reservoir 15 and the primary chamber 13. As this sealing is no longer established, bleeding the brakes becomes less effective, if not impossible.

FIG. 4 depicts a schematic perspective view of a seal 21 according to the invention. A seal such as this may be positioned equally well on a simple master cylinder or a tandem master cylinder. According to the invention, the lips of a seal 21 have reliefs 42. One particular embodiment of these reliefs 42, as shown in FIG. 4, is that they are in the form of protrusions 43, of ribs 43. These reliefs may, however as we shall see later, be in the form of hollows.

The ribs 43 according to FIG. 4 extend over the surface 44 of the inner lip 28 facing the outer lip 27. These ribs 43 extend along an axis parallel to the axis of movement of the piston, continuously over at least the entire height of the inner lip 28. Furthermore, these ribs 43 may be extended to form a pip 45 on the edge face 50 of the inner lip 28.

Such ribs 43 prevent the inner lip 28 from sticking tightly against the outer lip 27 because the shapes of the outer lip 27 and of the ribs 43 do not complement one another. As any sticking-together of the inner lip 28 and of the outer lip 27 during the brake bleeding is no longer tight, the vacuum 39 between these two lips 27 and 28 when the pedals are pumped is no longer created. The two lips 27 and 28 therefore no longer remain stuck together.

Likewise, the presence of the pips 45 on the edge face of the inner lip 28 prevents the lips 27 and 28 from sticking tightly against the wall 41 for the same reason that the shapes of the pips 45 and of the wall 41 do not complement one another. There is therefore a space between the wall 41 and the inner lip 28. This space prevents a depression, the vacuum 40, from being created between the lips and the wall 41.

The differences in pressure between the inside of the lips and the outside of the lips therefore disappear. The lips 27 and 28 may return to a free position and seal effectively. The hydraulic braking system can be bled under optimal conditions.

The number of reliefs 42 present may vary. However, with just one rib 43, the passageway that avoids the vacuum is limited. This single passage way removes pressure slowly. The seal 21 takes longer to return to its position. Having six or eight ribs 43 is enough to ensure quick and effective removal of pressure. The inner lip 28 here has six ribs 43.

The reliefs 42 may be arranged in groups. The ribs 43, in FIG. 4, are positioned in pairs on the outer part 44 of the inner lip 28. For each pair of reliefs 42, the space 47 separating the two reliefs is, for example, equal to about half the height 48 of the inner lip, as measured in the direction of movement of the piston.

Having pairs of ribs provides a better flow space as the lips begin to stick together. What happens is that the small space between the two ribs 43 prevents the lips from sticking together within this space 47. Likewise, the space 49 between the pips 45 prevents the lips from sticking tightly to the wall 41 inside this space 49. These spaces therefore allow the seal to return more quickly to a bleeding position and therefore allow better quality bleeding.

FIG. 4 depicts a seal 21 in which the ribs 43 are continuous from the edge face 50 of the inner lip 28 to the wall 44 of the inner wall 28 facing the outer lip 27. However, the reliefs 42 could be situated on the wall of absolutely any lip facing the other lip. Thus, the ribs 43 may be situated on the wall 51 of the outer lip 27 facing the inner lip 28 using the same method.

According to FIG. 4, the reliefs 42 are continuous from the edge face of the lip to a wall of the lip facing the other lip. According to another embodiment of the invention, the ribs 43 present on the lips and the pips 45 present on the edge face of the lips may be independent. Such independency allows the pips 45 to be positioned as required on the edge face of the lips, for example positioning them offset from the ribs 43.

FIG. 5 depicts a schematic perspective view of a seal 21 according to the invention. According to the invention, the reliefs 42 present on one lip of the seal 21 may have a hollow shape. In this instance, these hollows are in the form of grooves 52 made on the edge face 50 of the inner lip 28. These grooves 52 extend over the entire thickness 53 of the edge face 50 of the inner lip 28, providing a passage that regulates the pressure between the space between the lips and the wall 41. Furthermore, grooves 54 may be made on the outer wall 44 of the inner lip 28. These grooves 54, which extend over the entire height 48 of the inner lip 28, regulate the pressure between the lips and thus prevent the creation of a vacuum 39 that keeps the lips stuck together while the brakes are being bled.

In FIG. 5, the grooves 52 and the grooves 53 are independent, although like the rib-shaped reliefs, the grooves 52 and 54 may lie in the continuation of one another.

The grooves 52 situated on the edge face 50 of the inner lip 28 do not prevent the seal 21 from sealing. This is because that surface of the wall 41 that is situated under the grooves 52 continues to seal by pressing against the piston 4, the grooves 52 being just deep enough to allow the pressure to even out without preventing the inner lip 28 from sealing.

Furthermore, the grooves 54 may be situated on the inner wall 51 of the outer lip 27 so as to act as passages for regulating the pressure between the lips.

The invention claimed is:

1. Brake master cylinder (1) comprising
a piston (4) sliding in a bore (3) of a master cylinder body (2),
the master cylinder body (2) comprises an inlet (17) allowing hydraulic fluid to enter a chamber (13), and
a smooth seal (21) of circular shape with a U-shaped profile,
the U-shaped profile being formed by an inner lip (28) and an outer lip (27) of the seal,
the seal (21) being in contact via the inner lip (28) with the periphery of the piston (4), and via the outer lip (27) with the body (2) of the master cylinder (1), characterized in that it comprises
reliefs (42) which are localized and produced on one inner lip facing outer lip and positioned in pairs and in that said reliefs (42) are spaced apart by a spacing (47) equal to about half the height (48) of the inner lip (28) as measured parallel to an axis (7) of movement of the piston (4).

2. Master cylinder according to claim 1, characterized in that the reliefs (42) are protruding reliefs.

3. Master cylinder according to claim 1, characterized in that some reliefs (42) are hollow.

4. Master cylinder according to claim 1, characterized in that some reliefs (42) are situated on the edge face of the lip.

5. Master cylinder according to claim 1, characterized in that some reliefs (42) are continuous from the edge face of the lip to one wall of the lip, the inner or outer wall, that faces the other lip.

6. Master cylinder according to claim 1, characterized in that some reliefs (42) are situated on the outer lip (27).

* * * * *